April 13, 1948.  M. V. HALL  2,439,541
SELF-UNLOADING FEED WAGON
Filed July 29, 1946  2 Sheets-Sheet 1

INVENTOR.
Marshall V. Hall
BY
ATTORNEY

April 13, 1948. M. V. HALL 2,439,541
SELF-UNLOADING FEED WAGON
Filed July 29, 1946 2 Sheets-Sheet 2
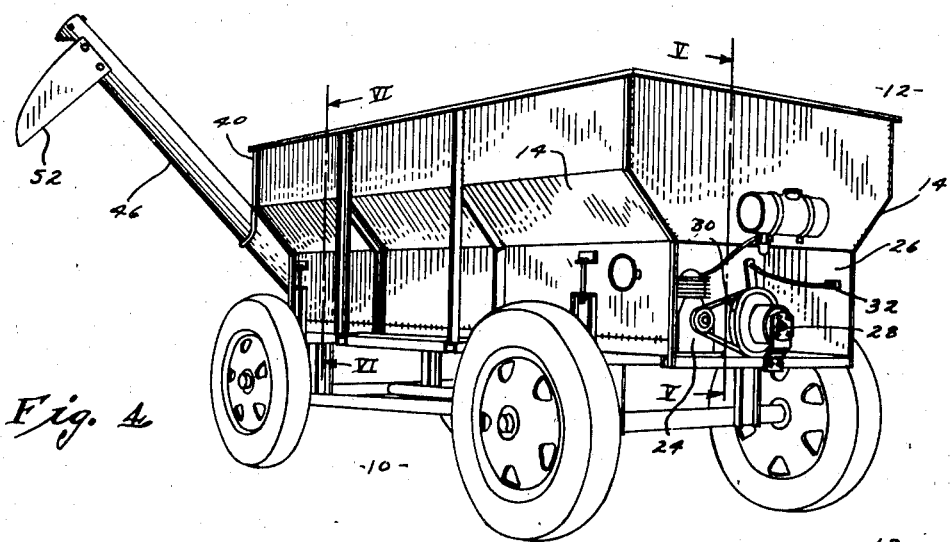
Fig. 4.
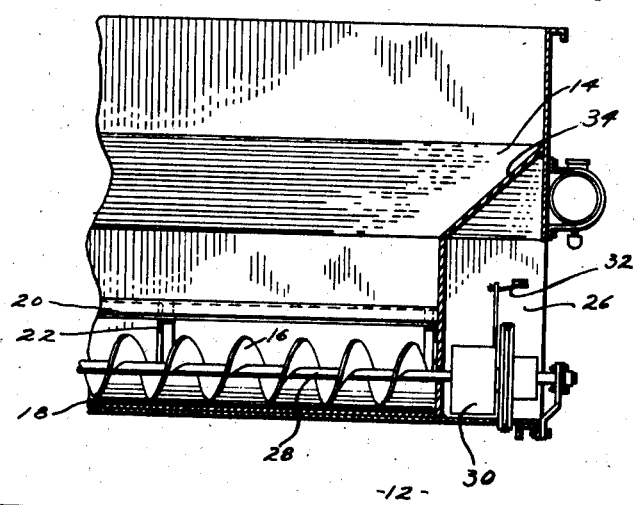
Fig. 5.
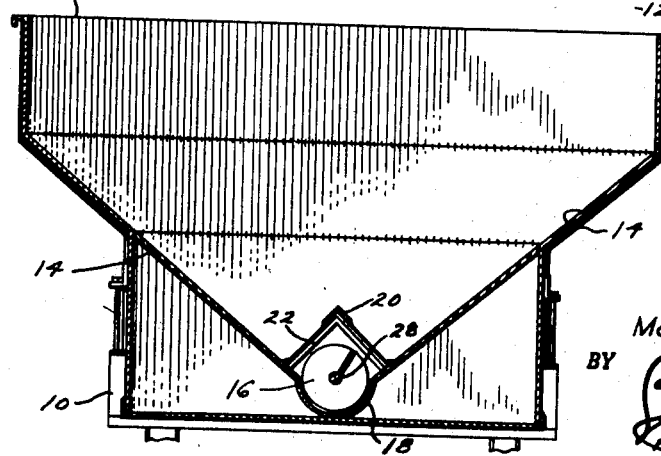
Fig. 6.
INVENTOR.
Marshall V. Hall
BY 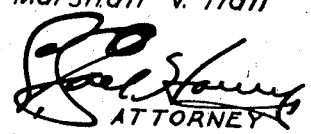
ATTORNEY Patented Apr. 13, 1948

2,439,541

UNITED STATES PATENT OFFICE 2,439,541

SELF-UNLOADING FEED WAGON

Marshall V. Hall, Hiawatha, Kans.

Application July 29, 1946, Serial No. 686,867

2 Claims. (Cl. 214—83.32)

This invention relates to material transporting and distributing vehicles of the character usually employed on farms or ranches where granular substance such as corn, oats, wheat and other grains are hauled in bulk to a point where the same are to be unloaded from the vehicle and spread along in a feeding trough or other place where the cattle may have access thereto.

One of the important objects of this invention is the provision of a vehicle of the aforementioned character having the property of unloading the material from its bed as it is pulled along a path of travel whereby the material being unloaded is spread or distributed in a location to one side of the vehicle.

A further object of this invention is the provision of a self-unloading feed wagon having structure for moving the load from the body of the wagon to a point remote therefrom with a minimum amount of effort and virtually no hand labor.

Other aims and important objects of this invention are to provide a vehicle of the self-unloading type which is provided with unique structure for feeding the material from the bed of the wagon to a pipe or conduit, which pipe, likewise has a means for motivating the material therethrough from one end to the other; to provide unique means for interconnecting the wagon bed and pipe and for holding the screw conveyors of the wagon bed and pipe in an overlapped condition where the material is transferred from the wagon bed to the pipe; and to include structure in the bracket which interconnects the wagon bed and pipe for adjustably supporting the pipe for movement about the axis of the conveyor within the wagon bed.

Other aims of the invention will appear during the course of the following specification referring to the accompanying drawing, wherein:

Fig. 4 is another perspective view of the self-unloading feed wagon illustrating the end thereof opposite to that shown in Fig. 1.

Fig. 5 is a fragmentary detailed sectional view taken on line V—V of Fig. 4; and Fig. 6 is a transverse cross-sectional view through the wagon taken on line VI—VI of Fig. 4.

Figure 1:
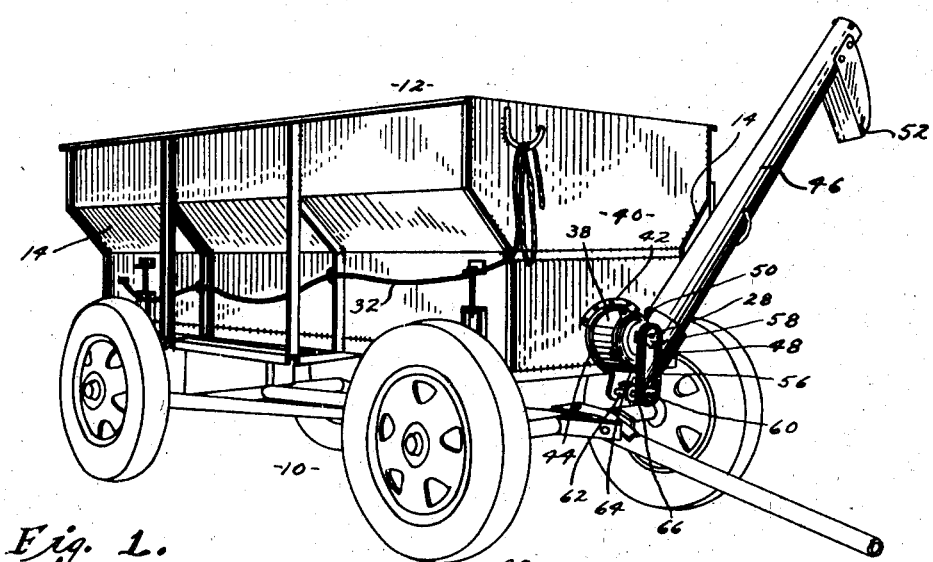
Fig. 1 is a perspective view of a self-unloading feed wagon made in accordance with the present invention.

The form of the invention illustrated for this description includes a wheeled chassis generally designated by the numeral 10 upon which the body 12 of the vehicle is mounted in any conventional manner.

The body is preferably constructed of sheet metal and contoured as clearly shown in Figs. 1, 4, 5 and 6 of the drawing. The cross-sectional form of the body is as shown in Fig. 6. It is substantially V-shaped in cross-sectional form and the apex or zone of convergence between the downwardly and inwardly inclined bottom walls 14 is provided with a conveyor 16, the lower half whereof is disposed within an arcuate trough 18. A shield 20 held in place by brackets 22 at the bottom of body 12, overlies conveyor 16 and prevents the load of the material being handled from clogging the conveyor 16 or preventing its easy rotation by the prime mover 24 which is in the form of an internal combustion engine located within a cavity 26 at one end of body 12.

The shaft 28 which carries conveyor 16 is joined to prime mover 24 through the medium of a conventional clutch 30, the operation whereof is controlled by a cable 32 extending to the normally forward end of the body 12 where it is within easy reach of the driver of a team that may be pulling the vehicle or the driver of a tractor to which the vehicle is attached by a portion of the wheeled chassis 10.

The angle of inclination of walls 14 and the upper end wall 34 insures that grain or other comminuted material within body 12 will migrate toward trough 18 and the conveyor 16 disposed therein. When prime mover 24 is in operation therefore, the material will be forced along trough 18 by conveyor 16 and thence out through outlet port 36 formed through one end wall of body 12.

A specially designed bracket 38 is clamped directly to the outer surface of the end wall 40 of body 12 in such manner as to allow movement thereof about the axis of shaft 28.

The arcuate clamp 42 overlies an annular flange 44 on bracket 38 and when this clamp 42 is loosened, the bracket may be bodily shifted about the axis of conveyor 16 for the purpose of altering the angle of inclination of pipe 46. This pipe is fitted into a split tubular section 48 of bracket 38 and held in place by clamping bolts 50; thus, when these bolts 50 are loosened, pipe 46 may be turned about its longitudinal axis to alter the angle of disposition of spout 52 that extends radially from the outermost end of pipe 46 and serves as a means for directing the material from pipe 46 toward a receptacle or place where the material is to be deposited.

A screw conveyor 54 rotatably mounted within pipe 46 is connected to conveyor 16 through the medium of sprocket chain 56, sprockets 58 and 60, shaft 62 and meshing bevel gears 64 and 66. Thus, when conveyor 16 is being driven by prime mover 24 motivating power will be transmitted to screw conveyor 54 in pipe 46 regardless of its angle of inclination.

Figure 2:
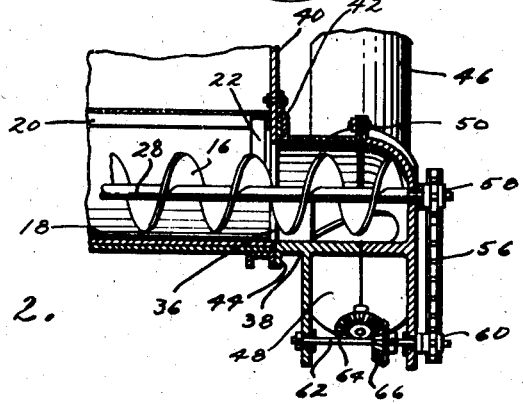
Fig. 2 is an enlarged fragmentary detailed sectional view taken on line II—II of Fig. 3.
Figure 3:
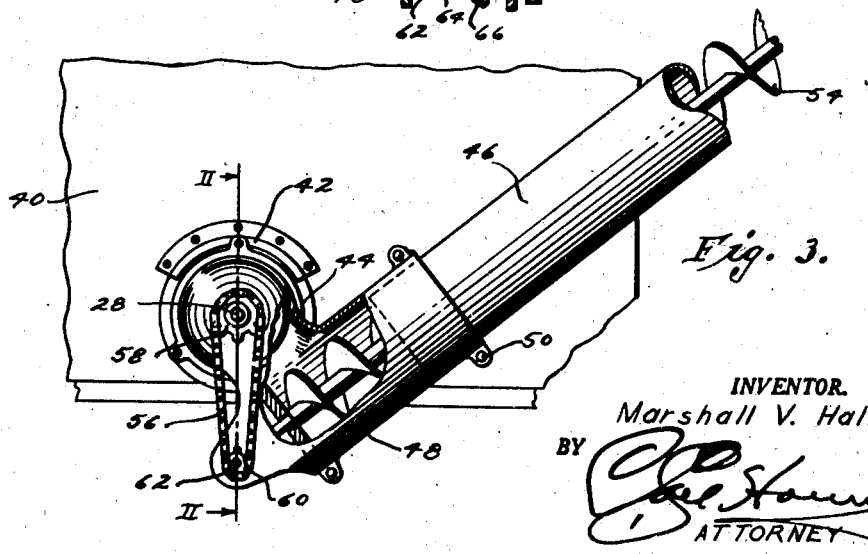
Fig. 3 is a fragmentary end elevational view of the vehicle, parts being broken away to reveal details of construction.

Reference to Figs. 2 and 3 readily teaches that conveyor 16 and screw conveyor 54 have their axes in overlapping relation and that a portion of screw conveyor 54 near one end thereof lies below conveyor 16. Bracket 38 is so formed as to transmit material from outlet port 36 to screw conveyor 54 in pipe 46 whereupon it is lifted to spout 52 for discharge.

It is obvious from the foregoing that such adjustments as may be necessary for the positioning of pipe 46 may be done without disassembling any part of the self-unloading vehicle and that a quick and positive movement of the material from within body 12 may be accomplished through the intermediacy of but one prime mover that is mounted directly upon the body of the vehicle in a place where it is not only out of the way but will not intefere with the functioning of the entire assembly.

It is realized that changes and modifications might be made in the vehicle without departing from the spirit of the invention or scope of the appended claims.

Having thus described my invention, what I claim as new and desire to secure by Letters Patent is:

1. A vehicle of the character described comprising a hollow body having a body of substantially inverted V-shaped cross sectional form and a pair of opposed end walls; a prime mover mounted on one of said ends of the body, the opposite end of the body having an outlet opening formed therein near the apex of the bottom wall thereof; an elongated screw conveyor extending between the ends of the body and having one end thereof passing through said outlet opening, the opposite end of the conveyor being operably joined to said prime mover, a hollow housing enclosing that part of the conveyor disposed exteriorly of said opposite end of the body, said housing being mounted on the opposite end of the body for rotation about the axis of said conveyor; a laterally extending pipe secured to said housing, said housing having an opening formed therein registering with said pipe; a second screw conveyor in said pipe having one end thereof overlapping said first mentioned conveyor; and structure operably interconnecting said conveyors.

2. A vehicle of the character described comprising a hollow body having a body of substantially inverted V-shaped cross sectional form and a pair of opposed end walls; a prime mover mounted on one of said ends of the body, the opposite end of the body having an outlet opening formed therein near the apex of the bottom wall thereof; an elongated screw conveyor extending between the ends of the body and having one end thereof passing through said outlet opening, the opposite end of the conveyor being operably joined to said prime mover, a hollow housing enclosing that part of the conveyor disposed exteriorly of said opposite end of the body, said housing being mounted on the opposite end of the body for rotation about the axis of said conveyor; a laterally extending pipe secured to said housing, said housing having an opening formed therein registering with said pipe; a second screw conveyor in said pipe having one end thereof overlapping said first mentioned conveyor; and structure operably interconnecting said conveyors, said conveyor in the body having a shaft forming a part thereof, one end of the shaft being rotatably mounted in said housing, the opposite end of the shaft passing through said one end of the body and having a bearing secured exteriorly of said one end of body for rotatably receiving the same.

MARSHALL V. HALL.

REFERENCES CITED

The following references are of record in the file of this patent:

UNITED STATES PATENTS

| Number | Name | Date |
|---|---|---|
| 802,698 | Kern | Oct. 24, 1905 |
| 2,147,992 | Schau | Feb. 21, 1939 |
| 2,290,460 | Winsor | July 21, 1942 |
| 2,417,020 | Shugart | Mar. 4, 1947 |
| 2,412,121 | Bradshaw | Dec. 3, 1946 |